(12) United States Patent
Kim et al.

(10) Patent No.: US 11,862,803 B2
(45) Date of Patent: Jan. 2, 2024

(54) RADICAL SCAVENGER, MANUFACTURING METHOD THEREFOR, MEMBRANE-ELECTRODE ASSEMBLY COMPRISING SAME, AND FUEL CELL COMPRISING SAME

(71) Applicants: KOLON INDUSTRIES, INC., Seoul (KR); KOREA ADVANCED INSTITUTE OF SCIENCE AND TECHNOLOGY, Daejeon (KR)

(72) Inventors: Jun-Young Kim, Seoul (KR); Moo-Seok Lee, Seoul (KR); Hee-Tak Kim, Daejeon (KR); Seongmin Yuk, Daejeon (JP); Dong-Hyun Lee, Daejeon (KR)

(*) Notice: Subject to any disclaimer, the term of this patent is extended or adjusted under 35 U.S.C. 154(b) by 144 days.

(21) Appl. No.: 16/647,545

(22) PCT Filed: Sep. 28, 2018

(86) PCT No.: PCT/KR2018/011503
§ 371 (c)(1),
(2) Date: Mar. 16, 2020

(87) PCT Pub. No.: WO2019/066534
PCT Pub. Date: Apr. 4, 2019

(65) Prior Publication Data
US 2020/0280074 A1     Sep. 3, 2020

(30) Foreign Application Priority Data
Sep. 29, 2017 (KR) .................. 10-2017-0127250

(51) Int. Cl.
*H01M 4/86* (2006.01)
*H01M 8/1004* (2016.01)
(Continued)

(52) U.S. Cl.
CPC ....... *H01M 4/8663* (2013.01); *H01M 8/1004* (2013.01); *H01M 8/1018* (2013.01); *H01M 2008/1095* (2013.01)

(58) Field of Classification Search
CPC . H01M 4/8663; H01M 8/1004; H01M 8/1018
See application file for complete search history.

(56) References Cited

U.S. PATENT DOCUMENTS 8,735,017 B2 *  5/2014  Kim ................... H01M 4/8892
                                                     429/465
2007/0212593 A1  9/2007  Raiford et al.
(Continued)

FOREIGN PATENT DOCUMENTS

JP    2005190752 A    7/2005
JP    2008117600 A    5/2008
(Continued)

OTHER PUBLICATIONS

Yao et al., Dopamine-assisted one-pot synthesis fo zinc ferrite embedded portou carbon nanosphers for ultrafast and stable lithium ion batteries, 2014, Royal Society of CHemistry, Chem. Commun., 2014, 50, 14597-14600 (Year: 2014).*
(Continued)

*Primary Examiner* — Helen Oi K Conley
(74) *Attorney, Agent, or Firm* — Harvest IP Law, LLP (57) ABSTRACT

A radical scavenger, a manufacturing method therefor, a membrane-electrode assembly including the radical scavenger, and a fuel cell including the membrane-electrode assembly are disclosed. The membrane-electrode assembly contains an ion exchange membrane; catalyst electrodes disposed on both surfaces of the ion exchange membrane, respectively; and a radical scavenger disposed at any one position selected from the group consisting of in the catalyst electrodes, in the ion exchange membrane, between the ion
(Continued)

exchange membrane and the catalyst electrodes, and a combination thereof.

6 Claims, 4 Drawing Sheets

(51) Int. Cl.
  *H01M 8/1018* (2016.01)
  *H01M 8/10* (2016.01)

(56) References Cited

U.S. PATENT DOCUMENTS

| | | | |
|---|---|---|---|
| 2009/0098033 A1* | 4/2009 | Lian | C09C 1/627 |
| | | | 423/213.5 |
| 2011/0070521 A1 | 3/2011 | Ishikawa | |
| 2011/0129760 A1* | 6/2011 | Takeshita | H01M 8/1048 |
| | | | 429/492 |
| 2011/0223515 A1* | 9/2011 | Kim | H01M 8/1004 |
| | | | 429/465 |
| 2012/0295155 A1* | 11/2012 | Deng | H01M 4/136 |
| | | | 429/200 |
| 2015/0236367 A1 | 8/2015 | Kim et al. | |
| 2016/0036049 A1* | 2/2016 | Wang | H01M 4/366 |
| | | | 429/229 |
| 2016/0240865 A1 | 8/2016 | Hirano | |

FOREIGN PATENT DOCUMENTS

| | | |
|---|---|---|
| JP | 2009231081 A | 10/2009 |
| JP | 4584334 B2 | 11/2010 |
| JP | 2012079621 A | 4/2012 |
| KR | 10-0774590 B1 | 11/2007 |
| KR | 10-1435945 B1 | 9/2014 |
| KR | 20150077065 A | 7/2015 |
| KR | 10-2015-0097024 A | 8/2015 |
| KR | 20160080604 A | 7/2016 |
| WO | 2012046870 A1 | 4/2012 |
| WO | 2017081631 A1 | 5/2017 |

OTHER PUBLICATIONS

Office action issued by Japan Patent Office dated Apr. 12, 2021.
International Search Report of PCT/KR2018/011503 dated Mar. 13, 2019 [PCT/ISA/210].
KR Office Action dated Jun. 28, 2021.
Wang Likai et al. Journal of Power Source.
Takashi Harada et al. Advanced Functional Materials.
Sheehan Margaret K et al. Catai Letter.
Ni Zhijiang et al. Journal of Colloid and Interface Science.
Counterpart European search report dated May 27, 2021.

\* cited by examiner

RADICAL SCAVENGER, MANUFACTURING METHOD THEREFOR, MEMBRANE-ELECTRODE ASSEMBLY COMPRISING SAME, AND FUEL CELL COMPRISING SAME

CROSS REFERENCE TO RELATED APPLICATIONS

This application is a National Stage of International Application No. PCT/KR2018/011503, filed Sep. 28, 2018, claiming priority to Korean Patent Application No. 10-2017-0127250, filed Sep. 29, 2017.

TECHNICAL FIELD

The present disclosure relates to a radical scavenger, a method of manufacturing the same, a membrane-electrode assembly including the same, and a fuel cell including the same, and more particularly to a radical scavenger capable of minimizing loss in ion conductivity of an ion exchange membrane while improving chemical durability of the ion exchange membrane, preventing chemical degradation of the ion exchange membrane occurring during long-term operation of a fuel cell, securing excellent long-term performance of the ion exchange membrane, and being commonly used irrespective of the kind of the ion exchange membrane, such as a fluorine-based ion exchange membrane or a hydrocarbon-based ion exchange membrane, a method of manufacturing the same, a membrane-electrode assembly including the same, and a fuel cell including the same.

BACKGROUND ART

A fuel cell, which is a cell including a power generation system for directly converting chemical reaction energy into electrical energy through an oxidation/reduction reaction of hydrogen and oxygen contained in a hydrocarbon-based fuel material, such as methanol, ethanol, or natural gas, has attracted attention as a next-generation clean energy source that is capable of replacing fossil energy due to the environmentally friendly characteristics thereof, such as high energy efficiency and reduced discharge of contaminants.

Such a fuel cell has an advantage in that unit cells are stacked to constitute a stack, whereby it is possible to provide various levels of power. In addition, the fuel cell has energy density 4 to 10 times that of a small-sized lithium battery, whereby the fuel cell has attracted attention as a small-sized mobile power source.

The stack of the fuel cell, which substantially generates electricity, has a structure in which several to several tens of unit cells, each of which includes a membrane-electrode assembly (MEA) and a separator (also referred to as a bipolar plate), are stacked, and the membrane-electrode assembly is generally configured to have a structure in which an oxidation electrode (an anode or a fuel electrode) and a reduction electrode (a cathode or an air electrode) are formed at opposite sides of an electrolyte membrane in the state in which the electrolyte membrane is disposed therebetween.

The fuel cell may be classified as an alkaline electrolyte membrane fuel cell or a polymer electrolyte membrane fuel cell (PEMFC) depending on the state and kind of an electrolyte. The polymer electrolyte membrane fuel cell has attracted attention as a mobile power source, a power source for vehicles, and a power source for home use due to a low operating temperature lower than 100° C., rapid starting and response characteristics, and excellent durability thereof.

Representative examples of the polymer electrolyte membrane fuel cell may include a proton exchange membrane fuel cell (PEMFC), which uses hydrogen gas as fuel, and a direct methanol fuel cell (DMFC), which uses liquid methanol as fuel.

The reaction that occurs in the polymer electrolyte membrane fuel cell will be described in brief. First, when fuel such as hydrogen gas is supplied to the oxidation electrode, protons ($H^+$) and electrons ($e^-$) are generated at the oxidation electrode as the result of the oxidation reaction of hydrogen. The generated protons are transferred to the reduction electrode via an ion exchange membrane, and the generated electrons are transferred to the reduction electrode via an external circuit. Oxygen is supplied from the reduction electrode, and oxygen is bonded with the protons and the electrons, whereby water is generated through the reduction reaction of oxygen.

Meanwhile, there are many technical problems to be solved in order to realize commercial use of the polymer electrolyte membrane fuel cell, and, in particular, it is necessary to realize high performance, a long lifespan, and a reduction in the price of the polymer electrolyte membrane fuel cell. The element that exerts the greatest influence thereon is the membrane-electrode assembly, and, in particular, the ion exchange membrane is one of the core factors that exert the greatest influence on the performance and price of the MEA.

The requirements of the ion exchange membrane necessary to operate the polymer electrolyte membrane fuel cell include high proton conductivity, high chemical stability, low fuel permeability, high mechanical strength, low moisture content, and excellent dimensional stability. A conventional ion exchange membrane tends not to normally realize high performance under specific temperature and relative-humidity environments, particularly under high-temperature/low-humidity conditions. As a result, a polymer electrolyte membrane fuel cell having the conventional ion exchange membrane applied thereto is limited in the range within which the fuel cell is capable of being applied.

A fluorine-based ion exchange membrane, such as Nafion, which is known as currently exhibiting the best performance, has disadvantages in terms of complexity in manufacturing processes, difficulty in manufacturing technology, and high price thereof. A hydrocarbon-based ion exchange membrane, which has been developed as an alternative thereto, has problems of low proton conductivity under high-temperature/low-humidity conditions, nonuniform interfacial characteristics, and relatively low durability. As a result, there are still many technical barriers to be overcome.

In addition, both high ion conductivity and excellent durability of such an ion exchange membrane are required. In particular, during long-term operation of the fuel cell, the thickness of the electrolyte membrane is reduced and pinholes are formed due to low chemical durability of the ion exchange membrane, whereby the fuel cell is degraded. In order to prevent this, methods of dispersing various radical scavengers in the ion exchange membrane have been proposed. However, the radical scavengers reduce ion conductivity of the ion exchange membrane, whereby output performance of the fuel cell is reduced.

DISCLOSURE

Technical Problem

It is an object of the present disclosure to provide a radical scavenger capable of improving chemical durability of an ion exchange membrane.

It is another object of the present disclosure to provide a method of manufacturing the radical scavenger.

It is another object of the present disclosure to provide a membrane-electrode assembly capable of minimizing loss in ion conductivity of an ion exchange membrane while improving chemical durability of the ion exchange membrane, preventing chemical degradation of the ion exchange membrane occurring during long-term operation of a fuel cell, securing excellent long-term performance of the ion exchange membrane, and being commonly used irrespective of the kind of the ion exchange membrane, such as a fluorine-based ion exchange membrane or a hydrocarbon-based ion exchange membrane.

It is a further object of the present disclosure to provide a fuel cell including the membrane-electrode assembly.

Technical Solution

In accordance with an aspect of the present disclosure, there is provided a radical scavenger including a core particle capable of decomposing a peroxide or a radical, the core particle being any one selected from the group consisting of a transition metal, a noble metal, an ion thereof, a salt thereof, an oxide thereof, and a mixture thereof, and a porous carbon coating layer located on a surface of the core particle.

The porous carbon coating layer may have a pore size of 1 angstrom (Å) to 20 angstrom (Å).

The porous carbon coating layer may have a thickness of 0.5 nm to 10 nm.

The transition metal may be any one selected from the group consisting of cerium (Ce), nickel (Ni), tungsten (W), cobalt (Co), chromium (Cr), zirconium (Zr), yttrium (Y), manganese (Mn), iron (Fe), titanium (Ti), vanadium (V), iridium (Ir), molybdenum (Mo), lanthanum (La), and neodymium (Nd), and the noble metal may be any one selected from the group consisting of silver (Au), platinum (Pt), ruthenium (Ru), palladium (Pd), and rhodium (Rh).

The ion of the transition metal or the noble metal may be any one selected from the group consisting of a cerium ion, a nickel ion, a tungsten ion, a cobalt ion, a chromium ion, a zirconium ion, an yttrium ion, a manganese ion, an iron ion, a titanium ion, a vanadium ion, an iridium ion, a molybdenum ion, a lanthanum ion, a neodymium ion, a silver ion, a platinum ion, a ruthenium ion, a palladium ion, and a rhodium ion.

The oxide of the transition metal or the noble metal may be any one selected from the group consisting of cerium oxide, nickel oxide, tungsten oxide, cobalt oxide, chromium oxide, zirconium oxide, yttrium oxide, manganese oxide, iron oxide, titanium oxide, vanadium oxide, iridium oxide, molybdenum oxide, lanthanum oxide, and neodymium oxide.

The salt of the transition metal or the noble metal may be any one selected from the group consisting of carbonate, acetate, chloride salt, fluoride salt, sulfate, phosphate, tungstate, hydrate, ammonium acetate, ammonium sulfate, and acetylacetonate of the transition metal or the noble metal.

In accordance with another aspect of the present disclosure, there is provided a method of manufacturing a radical scavenger, the method including coating a carbon precursor on the surface of a core particle capable of decomposing a peroxide or a radical, the core particle being any one selected from the group consisting of a transition metal, a noble metal, an ion thereof, a salt thereof, an oxide thereof, and a mixture thereof, and carbonizing the carbon precursor on the surface of the core particle to form a porous carbon coating layer.

The step of coating the carbon precursor on the surface of the core particle may include adding the carbon precursor to a solvent to manufacture a composition for coating a carbon precursor, and adding and stirring the core particle to the composition for coating the carbon precursor.

In the step of coating the carbon precursor on the surface of the core particle, the composition for coating the carbon precursor may include 0.01 parts by weight to 10 parts by weight of the carbon precursor based on 100 parts by weight of the core particle.

The carbon precursor may be any one selected from the group consisting of dopamine, acrylonitrile, vinylpyrrolidone, lignin, a polymer, and a mixture thereof.

The step of adding and stirring the core particle to the composition for coating the carbon precursor may be performed at 0° C. to 80° C. for 0.5 hours to 50 hours at 100 rpm to 500 rpm.

Carbonization of the carbon precursor may include stabilization performed at a temperature of 100° C. to 400° C. in a nitrogen or argon atmosphere, and carbonization performed at a temperature of 600° C. to 900° C. in a nitrogen or argon atmosphere.

In accordance with another aspect of the present disclosure, there is provided a membrane-electrode assembly including an ion exchange membrane, catalyst electrodes disposed at opposite surfaces of the ion exchange membrane, and the radical scavenger, the radical scavenger being located at any one position selected from the group consisting of in the catalyst electrodes, in the ion exchange membrane, between the ion exchange membrane and the catalyst electrodes, and a combination thereof.

The membrane-electrode assembly may further include interfacial adhesion layers located between the ion exchange membrane and the catalyst electrodes, wherein each of the interfacial adhesion layers may include an ionomer and the radical scavenger.

Each of the interfacial adhesion layers may include 0.1 wt % to 70 wt % of the radical scavenger based on the total weight of each of the interfacial adhesion layers.

Each of the interfacial adhesion layers may have a thickness of 10 nm to 10 μm.

The loading amount of each of the interfacial adhesion layers may be 0.01 mg/cm$^2$ to 2.0 mg/cm$^2$.

In accordance with a further aspect of the present disclosure, there is provided a fuel cell including the membrane-electrode assembly.

Advantageous Effects

A membrane-electrode assembly according to the present disclosure is capable of minimizing loss in ion conductivity of an ion exchange membrane while improving chemical durability of the ion exchange membrane, preventing chemical degradation of the ion exchange membrane occurring during long-term operation of a fuel cell, securing excellent long-term performance of the ion exchange membrane, and being commonly used irrespective of the kind of the ion exchange membrane, such as a fluorine-based ion exchange membrane or a hydrocarbon-based ion exchange membrane.

BEST MODE

Hereinafter, embodiments of the present disclosure will be described in detail. However, the embodiments of the present disclosure are provided merely for illustration, and the present disclosure is not limited thereto. The present disclosure is defined only by the category of the appended claims.

Unless particularly mentioned in this specification, it will be understood that, when an element such as a layer, film, region, or substrate is referred to as being "on" another element, it may be "directly on" the other element or an intervening element may also be present.

A radical scavenger according to an embodiment of the present disclosure includes a core particle capable of decomposing a peroxide or a radical, the core particle being any one selected from the group consisting of a transition metal, a noble metal, an ion thereof, a salt thereof, an oxide thereof, and a mixture thereof, and a porous carbon coating layer located on the surface of the core particle.

Since the reduction reaction of oxygen at a cathode of a polymer electrolyte membrane fuel cell is performed via hydrogen peroxide ($H_2O_2$), hydrogen peroxide may be generated at the cathode, or a hydroxyl radical ($\cdot OH^-$) may be generated from the generated hydrogen peroxide. In addition, as oxygen molecules are transmitted through an ion exchange membrane at an anode of the polymer electrolyte membrane fuel cell, the hydrogen peroxide or hydroxyl radical may also be generated at the anode. The generated hydrogen peroxide or hydroxyl radical deteriorates a polymer including a sulfonic acid group included in the ion exchange membrane or the catalyst electrode.

Consequently, the core particle capable of decomposing the peroxide or the radical may be included in order to inhibit generation of a radical from the peroxide or to decompose the generated radical, thereby preventing degradation of the ion exchange membrane or the catalyst electrode and thus improving chemical durability of the ion exchange membrane or the catalyst electrode.

Any core particle capable of decomposing the peroxide or the radical may be used in the present disclosure without being particularly restricted, as long as it is possible to rapidly decompose a peroxide (particularly, hydrogen peroxide) or a radical (particularly, a hydroxyl radical) generated during operation of the polymer electrolyte membrane fuel cell. Specifically, for example, the core particle capable of decomposing the peroxide or the radical may be a transition metal capable of decomposing the peroxide or the radical, a noble metal capable of decomposing the peroxide or the radical, an ion thereof, a salt thereof, or an oxide thereof.

Specifically, the transition metal capable of decomposing the peroxide or the radical may be any one selected from the group consisting of cerium (Ce), nickel (Ni), tungsten (W), cobalt (Co), chromium (Cr), zirconium (Zr), yttrium (Y), manganese (Mn), iron (Fe), titanium (Ti), vanadium (V), iridium (Ir), molybdenum (Mo), lanthanum (La), and neodymium (Nd).

In addition, the noble metal capable of decomposing the peroxide or the radical may be any one selected from the group consisting of silver (Au), platinum (Pt), ruthenium (Ru), palladium (Pd), and rhodium (Rh).

In addition, the ion of the transition metal or the noble metal capable of decomposing the peroxide or the radical may be any one selected from the group consisting of a cerium ion, a nickel ion, a tungsten ion, a cobalt ion, a chromium ion, a zirconium ion, an yttrium ion, a manganese ion, an iron ion, a titanium ion, a vanadium ion, an iridium ion, a molybdenum ion, a lanthanum ion, a neodymium ion, a silver ion, a platinum ion, a ruthenium ion, a palladium ion, and a rhodium ion. Specifically, in the case of cerium, a cerium three-valence ion ($Ce^{3+}$) or a cerium four-valence ion ($Ce^{4+}$) may be used.

In addition, the oxide of the transition metal or the noble metal capable of decomposing the peroxide or the radical may be any one selected from the group consisting of cerium oxide, nickel oxide, tungsten oxide, cobalt oxide, chromium oxide, zirconium oxide, yttrium oxide, manganese oxide, iron oxide, titanium oxide, vanadium oxide, iridium oxide, molybdenum oxide, lanthanum oxide, and neodymium oxide.

In addition, the salt of the transition metal or the noble metal capable of decomposing the peroxide or the radical may be any one selected from the group consisting of carbonate, acetate, chloride salt, fluoride salt, sulfate, phosphate, tungstate, hydrate, ammonium acetate, ammonium sulfate, and acetylacetonate of the transition metal or the noble metal. Specifically, in the case of cerium, cerium carbonate, cerium acetate, cerium chloride, cerium sulfate, ammonium cerium (II) acetate, or ammonium cerium (IV) sulfate may be used, and cerium acetylacetonate may be used as the organic metal complex salt.

In the case in which the core particle capable of decomposing the peroxide or the radical is dispersed in the ion exchange membrane or the catalyst electrode in order to prevent the ion exchange membrane from being degraded by the radical, however, the core particle capable of decomposing the peroxide or the radical may be eluted during operation of the fuel cell.

In the radical scavenger, therefore, a porous carbon coating layer may be formed on the surface of the core particle capable of decomposing the peroxide or the radical in order to reduce mobility of the core particle capable of decomposing the peroxide or the radical, whereby the core particle capable of decomposing the peroxide or the radical is stabilized and thus it is possible to prevent elution of the core particle capable of decomposing the peroxide or the radical.

However, it is necessary for the porous carbon coating layer to have a pore size, thickness, and porosity appropriate not to disturb decomposition of the peroxide or the radical performed by the radical scavenger.

Figure 1:
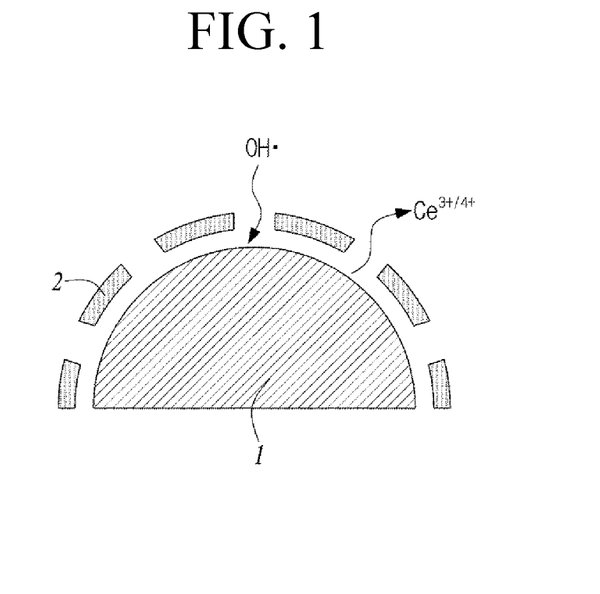
FIG. 1 is a view schematically showing a radical scavenger including a porous carbon coating layer, wherein the pore size, thickness, or porosity of the porous carbon coating layer is appropriate to decompose a peroxide or a radical.
Figure 2:
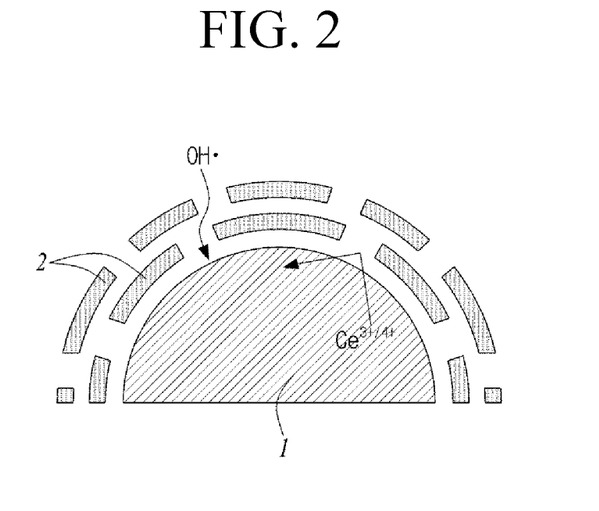
FIGS. 2 and 3 are views schematically showing a radical scavenger including a porous carbon coating layer, wherein the pore size, thickness, or porosity of the porous carbon coating layer is not appropriate to decompose a peroxide or a radical.
Figure 3:
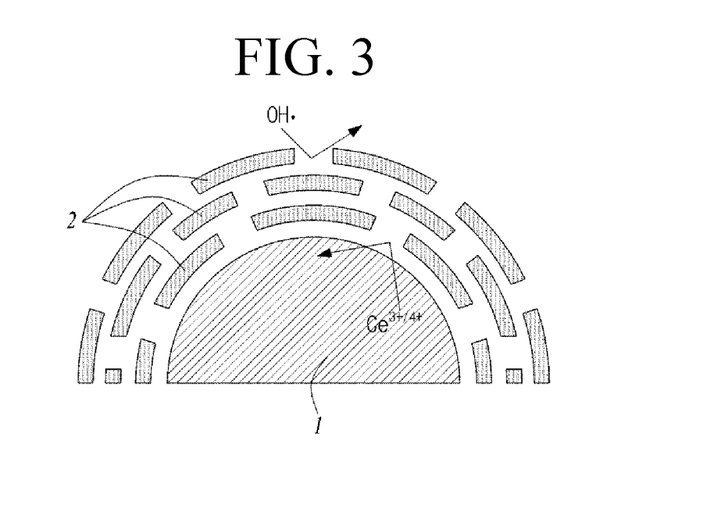

FIGS. 1 to 3 are views schematically showing radical scavengers including porous carbon coating layers having different pore sizes, thicknesses, and porosities. Referring to FIG. 1, the pore size, thickness, or porosity of the porous carbon coating layer 2 formed on the surface of the core particle 1 capable of decomposing the peroxide or the radical is appropriate. As a result, a hydroxyl radical (·OH⁻) passes through the porous carbon coating layer 2, and then reacts with cerium, which is the core particle 1 capable of decomposing the peroxide or the radical. A cerium ion ($Ce^{3+/4+}$), which is a reaction product, passes through the porous carbon coating layer 2, and is then discharged outside. Consequently, it can be seen that the radical scavenger is capable of appropriately decomposing the peroxide or the radical.

Referring to FIGS. 2 and 3, however, the pore size, thickness, or porosity of the porous carbon coating layer 2 is not appropriate. As a result, the hydroxyl radical (·OH⁻) does not pass through the porous carbon coating layer 2, or the cerium ion ($Ce^{3+/4+}$) does not pass through the porous carbon coating layer 2. Consequently, it can be seen that the radical scavenger is not capable of appropriately decomposing the peroxide or the radical.

In order for the porous carbon coating layer to allow the radical or the reaction product of the radical to smoothly pass therethrough, the pore size of the porous carbon coating layer may range from 1 angstrom (Å) to 20 angstrom (Å), more specifically from 3 angstrom (Å) to 5 angstrom (Å). In addition, the thickness of the porous carbon coating layer may range from 0.5 nm to 10 nm, more specifically from 1 nm to 5 nm. In the case in which each of the pore size and the thickness of the porous carbon coating layer deviate from the above range, it may be difficult for the radical or the reaction product of the radical to smoothly pass through the porous carbon coating layer, whereby it may be difficult for the radical scavenger to smoothly decompose the peroxide or the radical.

A method of manufacturing a radical scavenger according to another embodiment of the present disclosure includes a step of coating a carbon precursor on the surface of a core particle capable of decomposing a peroxide or a radical, the core particle being any one selected from the group consisting of a transition metal, a noble metal, an ion thereof, a salt thereof, an oxide thereof, and a mixture thereof, and a step of carbonizing the carbon precursor on the surface of the core particle to form a porous carbon coating layer.

A description of the particle capable of decomposing the peroxide or the radical and the porous carbon coating layer is the same as the above description, and therefore a duplicate description thereof will be omitted.

Meanwhile, the step of coating the carbon precursor on the surface of the core particle may specifically include a step of adding the carbon precursor to a solvent to manufacture a composition for coating a carbon precursor and a step of adding and stirring the core particle to the composition for coating the carbon precursor.

The carbon precursor may be any one selected from the group consisting of dopamine, acrylonitrile, vinylpyrrolidone, lignin, a polymer, and a mixture thereof. More specifically, dopamine may be used as the carbon precursor. In the case in which dopamine is used as the carbon precursor, it is possible to form a uniform coating thickness through polymerization reaction of polydopamine on the surface of the core particle.

In order to add the carbon precursor to a solvent to manufacture a composition for coating a carbon precursor, any one selected from the group consisting of water, ethanol, methanol, acetone, 1-propanol, 2-propanol, 1-butanol, 2-butanol, a tris-hydrochloride buffer solution, and a mixture thereof may be used as the solvent.

At this time, the composition for coating the carbon precursor may include 0.01 parts by weight to 10 parts by weight, more specifically 0.1 parts by weight to 1 part by weight, of the carbon precursor based on 100 parts by weight of the core particle. In the case in which the content of the carbon precursor is less than 0.01 parts by weight based on 100 parts by weight of the core particle, uniform coating may not be achieved. In the case in which the content of the carbon precursor is greater than 10 parts by weight, a cluster may be formed by the carbon coating layer.

The step of adding and stirring the core particle to the composition for coating the carbon precursor may be performed at 0° C. to 80° C. for 0.5 hours to 50 hours at 100 rpm to 500 rpm, more specifically at 20° C. to 40° C. for 8 hours to 16 hours at 200 rpm to 300 rpm. In the case in which the stirring is performed at lower than 0° C. for shorter than 0.5 hours at less than 100 rpm, a nonuniform or too thin coating layer may be formed. In the case in which the stirring is performed at higher than 80° C. for longer than 50 hours, a too thick coating layer may be formed.

Subsequently, the carbon precursor on the surface of the core particle is carbonized to form a porous carbon coating layer. A carbonization process may include a stabilization step performed at a low temperature and a carbonization step performed at a high temperature. The stabilization may be performed at 100° C. to 400° C. in a nitrogen or argon atmosphere, more specifically at 200° C. to 300° C. in a nitrogen atmosphere. The carbonization of the carbon precursor may be performed at 600° C. to 900° C. in a nitrogen or argon atmosphere, more specifically at 700° C. to 800° C. in a nitrogen atmosphere. In the case in which the carbonization is performed at lower than 600° C., the carbon precursor may not be completely converted into carbon. In the case in which the carbonization is performed in an atmosphere other than the nitrogen or argon atmosphere, a carbon layer may be oxidized.

Through the method of manufacturing the radical scavenger, the porous carbon coating layer may be formed so as to have a pore size, thickness, and porosity appropriate not to disturb decomposition of the peroxide or the radical performed by the radical scavenger.

A membrane-electrode assembly according to another embodiment of the present disclosure includes an ion exchange membrane, catalyst electrodes disposed at opposite surfaces of the ion exchange membrane, and the radical scavenger located at any one position selected from the group consisting of in the catalyst electrodes, in the ion exchange membrane, between the ion exchange membrane and the catalyst electrodes, and a combination thereof.

Figure 4:
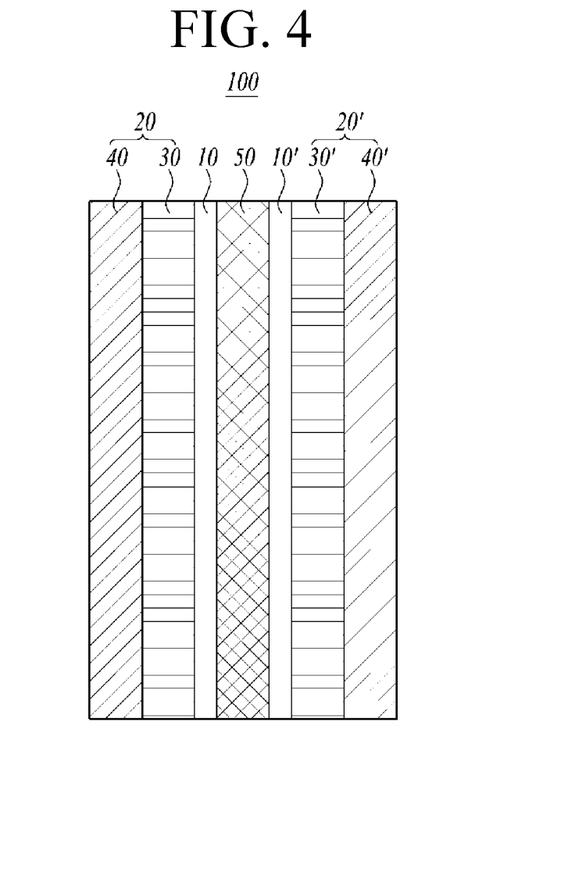
FIG. 4 is a sectional view schematically showing a membrane-electrode assembly according to an embodiment of the present disclosure.

FIG. 4 is a sectional view schematically showing the membrane-electrode assembly.

Referring to FIG. 4, the membrane-electrode assembly 100 includes the ion exchange membrane 50 and electrodes 20 and 20' disposed at opposite surfaces of the ion exchange membrane 50. The electrodes 20 and 20' respectively include electrode substrates 40 and 40' and catalyst electrodes 30 and 30' formed at surfaces of the electrode substrates 40 and 40', and may further include microporous layers (not shown) disposed between the electrode substrates 40 and 40' and the catalyst electrodes 30 and 30', the microporous layers including conductive microparticles, such as carbon powder or carbon black, for easy material diffusion at the electrode substrates 40 and 40'.

In the membrane-electrode assembly 100, the electrode 20, which is disposed at one surface of the ion exchange membrane 50 to perform an oxidation reaction in which protons and electrons are generated from fuel transferred to the catalyst electrode 30 via the electrode substrate 40, is referred to as an anode, and the electrode 20', which is disposed at the other surface of the ion exchange membrane 50 to perform a reduction reaction in which water is generated from protons supplied through the ion exchange membrane 50 and an oxidant transferred to the catalyst electrode 30' via the electrode substrate 40', is referred to as a cathode.

Meanwhile, the membrane-electrode assembly 100 may further include interfacial adhesion layers 10 and 10' located between the ion exchange membrane 50 and the catalyst electrodes 30 and 30'.

The interfacial adhesion layers 10 and 10' may enable the membrane-electrode assembly 100 to have low hydrogen permeability without reducing proton conductivity, may improve interfacial bondability between the catalyst electrodes 30 and 30' and the ion exchange membrane 50, thereby improving durability of the membrane-electrode assembly 100, and may improve performance and durability of the membrane-electrode assembly 100 under high-temperature/low-humidity conditions.

In FIG. 4, the interfacial adhesion layers 10 and 10' are shown as being disposed at opposite surfaces of the ion exchange membrane 50; however, the present disclosure is not limited thereto. The interfacial adhesion layers 10 and 10' may be located only at one surface of the ion exchange membrane 50.

Each of the interfacial adhesion layers 10 and 10' includes an ionomer and the radical scavenger.

The ionomer included in each of the interfacial adhesion layers 10 and 10' may improve interfacial bondability between the catalyst electrodes 30 and 30' and the ion exchange membrane 50, thereby improving durability of the membrane-electrode assembly 100.

The ionomer included in each of the interfacial adhesion layers 10 and 10' may have an equivalent weight (EW) of 1100 g/eq or less, specifically 500 g/eq to 1100 g/eq. The equivalent weight of the ionomer is the molecular mass of the ionomer per ion exchange group included in the ionomer.

The interfacial adhesion layers 10 and 10' may provide positive effects in managing water in the membrane-electrode assembly 100 under low-humidity conditions through adjustment of the equivalent weight of the ionomer. In the case in which the ionomer having the above equivalent weight is used, it is possible to improve performance of the membrane-electrode assembly 100 without reducing proton conductivity. Meanwhile, in the case in which the equivalent weight of the ionomer is less than 500 g/eq, an ionomer elution phenomenon or hydrogen fuel permeability may increase. In the case in which the equivalent weight of the ionomer is greater than 1100 g/eq, proton conductivity may be reduced under high-temperature and low-humidity conditions.

The ionomer included in each of the interfacial adhesion layers 10 and 10' may be any one selected from the group consisting of a fluorine-based ionomer, a hydrocarbon-based ionomer, and a mixture thereof.

The fluorine-based ionomer may be a fluorine-based polymer having a cation exchange group that is capable of transferring cations, such as protons, or an anion exchange group that is capable of transferring anions, such as hydroxyl ions, carbonate, or bicarbonate, and including fluorine in the main chain thereof, or a partially fluorinated polymer, such as a polystyrene-graft-ethylene tetrafluoroethylene copolymer or a polystyrene-graft-polytetrafluoroethylene copolymer. Concrete examples of the fluorine-based ionomer may be fluorine-based polymers including poly(perfluorosulfonic acid), poly(perfluorocarboxylic acid), a copolymer of tetrafluoroethylene and fluoro vinyl ether including a sulfonic acid group, and difluorinated polyetherketone sulfide, or a mixture thereof. The cation exchange group may be any one selected from the group consisting of a sulfonic acid group, a carboxyl group, a boronic acid group, a phosphate group, an imide group, a sulfonimide group, a sulfonamide group, and a combination thereof. In general, the cation exchange group may be a sulfonic acid group or a carboxyl group. In addition, the fluorine-based ionomer may be used either alone or as a mixture of two or more materials.

In addition, the hydrocarbon-based ionomer is a hydrocarbon-based polymer having a cation exchange group that is capable of transferring cations, such as protons, or an anion exchange group that is capable of transferring anions, such as hydroxyl ions, carbonate, or bicarbonate, and including imidazole, benzimidazole, polyamide, polyamide imide, polyimide, polyacetal, polyethylene, polypropylene, acrylic resin, polyester, polysulfone, polyether, polyether imide, polyether sulfone, polyether imide, polycarbonate, polystyrene, polyphenylene sulfide, polyether ether ketone, polyether ketone, polyaryl ether sulfone, polyphosphazene, or polyphenyl quinoxaline in the main chain thereof. Concrete examples of the hydrocarbon-based ionomer may include, but are not limited to, hydrocarbon-based polymers including sulfonated polyimide (S-PI), sulfonated polyarylether sulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and a mixture thereof. In addition, the hydrocarbon-based ionomer may be used either alone or as a mixture of two or more materials.

Meanwhile, the membrane-electrode assembly 100 includes the radical scavenger located at any one position selected from the group consisting of in the catalyst electrodes 30 and 30', in the ion exchange membrane 50, between the ion exchange membrane 50 and the catalyst electrodes 30 and 30', and a combination thereof. Specifically, "between the ion exchange membrane 50 and the catalyst electrodes 30 and 30'" may mean that the radical scavenger is included in the interfacial adhesion layers 10 and 10' or that the radical scavenger is included on the surfaces of the ion exchange membrane 50, on the surfaces of the catalyst electrodes 30 and 30', or on the surfaces of the interfacial adhesion layers 10 and 10'.

Particularly, in the case in which the radical scavenger is included in the interfacial adhesion layers 10 and 10', the radical scavenger is not present in the ion exchange membrane 50 in a dispersed state but is concentrated in the interfacial adhesion layers 10 and 10', which are inserted between the ion exchange membrane 50 and the catalyst electrodes 30 and 30', whereby it is possible to improve chemical durability of the ion exchange membrane 50 while minimizing loss in ion conductivity of the ion exchange membrane 50. That is, the radical generated at the catalyst electrodes 30 and 30' spreads toward the ion exchange membrane 50, but the radical is decomposed by the radical scavenger concentrated in the interfacial adhesion layers 10 and 10' before reaching the ion exchange membrane 50, whereby it is possible to prevent degradation of the ion exchange membrane 50.

In addition, degradation of the ion exchange membrane 50 is performed from the interfaces between the ion exchange membrane 50 and the catalyst electrodes 30 and 30'. In the case in which the radical scavenger is concentrated in the interfacial adhesion layers 10 and 10', therefore, it is possible to achieve higher chemical durability than in the case in which the radical scavenger is dispersed in the ion exchange membrane 50.

In the case in which the radical scavenger is included in the interfacial adhesion layers 10 and 10', however, the radical scavenger may be eluted during operation of the fuel cell. In the radical scavenger, however, the porous carbon coating layer is formed on the surface of the core particle capable of decomposing the peroxide or the radical in order to stabilize the core particle capable of decomposing the peroxide or the radical, whereby it is possible to prevent elution of the core particle capable of decomposing the peroxide or the radical.

Each of the interfacial adhesion layers 10 and 10' may include 0.1 wt % to 70 wt % or 75 wt % to 15 wt % of the radical scavenger based on the total weight of each of the interfacial adhesion layers 10 and 10'. In the case in which the content of the radical scavenger is less than 0.1 wt %, the effect of improving chemical durability may be insignificant. In the case in which the content of the radical scavenger is greater than 70 wt %, ion transfer resistance in the membrane-electrode assembly 100 may be greatly increased.

In addition, the thickness of each of the interfacial adhesion layers 10 and 10' may be 10 nm to 10 μm or 0.5 μm to 2 μm, and the loading amount of each of the interfacial adhesion layers 10 and 10' may be 0.01 mg/cm$^2$ to 2.0 mg/cm$^2$. In the case in which the thickness of each of the interfacial adhesion layers 10 and 10' is less than 10 nm or the loading amount of each of the interfacial adhesion layers is less than 0.01 mg/cm$^2$, the effect of improving chemical durability may be insignificant, and interfacial bondability between the ion exchange membrane 50 and the catalyst electrodes 30 and 30' may not be improved. In the case in which the thickness of each of the interfacial adhesion layers 10 and 10' is greater than 10 μm or the loading amount of each of the interfacial adhesion layers is greater than 2.0 mg/cm$^2$, ion transfer resistance in the membrane-electrode assembly 100 may be greatly increased.

Meanwhile, the ion exchange membrane 50 includes an ionic conductor. The ionic conductor may be a cationic conductor having a cation exchange group that is capable of transferring cations, such as protons, or an anionic conductor having an anion exchange group that is capable of transferring anions, such as hydroxyl ions, carbonate, or bicarbonate.

The cation exchange group may be any one selected from the group consisting of a sulfonic acid group, a carboxyl group, a boronic acid group, a phosphate group, an imide group, a sulfonimide group, a sulfonamide group, and a combination thereof. In general, the cation exchange group may be a sulfonic acid group or a carboxyl group.

The cationic conductor may be a fluorine-based polymer having the cation exchange group and including fluorine in the main chain thereof, a hydrocarbon-based ionomer, such as benzimidazole, polyamide, polyamide imide, polyimide, polyacetal, polyethylene, polypropylene, acrylic resin, polyester, polysulfone, polyether, polyether imide, polyether sulfone, polyether imide, polycarbonate, polystyrene, polyphenylene sulfide, polyether ether ketone, polyether ketone, polyaryl ether sulfone, polyphosphazene, or polyphenyl quinoxaline, a partially fluorinated polymer, such as a polystyrene-graft-ethylene tetrafluoroethylene copolymer or a polystyrene-graft-polytetrafluoroethylene copolymer, or sulfonyl imide.

More specifically, in the case in which the cationic conductor is a proton conductor, each of the polymers may include a cation exchange group selected from the group consisting of a sulfonic acid group, a carboxyl group, a phosphate group, a phosphonic acid group, and a derivative thereof in the side chain thereof. As a concrete example, the cationic conductor may be, but is not limited to, a fluorine-based polymer including poly(perfluorosulfonic acid), poly(perfluorocarboxylic acid), a copolymer of tetrafluoroethylene and fluoro vinyl ether including a sulfonic acid group, difluorinated polyetherketone sulfide, and a mixture thereof, or a hydrocarbon-based polymer including sulfonated polyimide (S-PI), sulfonated polyarylether sulfone (S-PAES), sulfonated polyetheretherketone (S PEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, or a mixture of thereof.

Meanwhile, a hydrocarbon-based ionic conductor, which has excellent ion conductivity and is advantageous in terms of price, is preferably used as the cationic conductor.

The anionic conductor is a polymer capable of transporting anions, such as hydroxyl ions, carbonate, or bicarbonate. The anionic conductor is commercially available in the form of hydroxide or halide (generally chloride), and the anionic conductor may be used in an industrial water purification, metal separation, or catalyst process.

A polymer doped with metal hydroxide may generally be used as the anionic conductor. Specifically, poly(ether sulfone), polystyrene, a vinyl-based polymer, poly(vinyl chloride), poly(vinylidene fluoride), poly(tetrafluoroethylene), poly(benzimidazole), or poly(ethylene glycol), doped with metal hydroxide, may be used as the anionic conductor.

Meanwhile, the ion exchange membrane 50 may be a reinforcement membrane configured to have a structure in which pores in a fluorine-based porous support, such as e-PTFE, or a porous support, such as a porous nanoweb support manufactured by electrospinning, etc., are filled with the ionic conductor.

The ion exchange capacity (IEC) of the ion exchange membrane 50 may be 0.8 to 4.0 meq/g or 1.0 to 3.5 meq/g. In the case in which the ion exchange capacity of the ion exchange membrane 50 is less than 1.0 meq/g, movement of protons may be reduced under low-humidity conditions. In the case in which the ion exchange capacity of the ion exchange membrane 50 is greater than 3.5 meq/g, interfacial transfer resistance may be increased as humidity increases.

In addition, the thickness of the ion exchange membrane 50 may be 3 to 25 μm or 5 to 20 μm. In the case in which the thickness of the ion exchange membrane 50 is less than 3 μm, hydrogen fuel permeability may be abruptly increased under high-temperature and low-humidity conditions, whereby chemical stability of the ion exchange membrane may be reduced. In the case in which the thickness of the ion exchange membrane 50 is greater than 25 μm, movement of protons may be reduced under low-humidity conditions, whereby resistance of the ion exchange membrane may be increased and thus ion conductivity may be reduced.

Any one may be used as the core particle in each of the catalyst electrodes 30 and 30', as long as the core particle can be used as a catalyst in hydrogen oxidation reaction and oxygen reduction reaction. Preferably, a platinum-based metal is used as the core particle.

The platinum-based metal may include one selected from the group consisting of platinum (Pt), palladium (Pd), ruthenium (Ru), iridium (Ir), osmium (Os), a platinum-M alloy (M being at least one selected from the group consisting of palladium (Pd), ruthenium (Ru), iridium (Ir), osmium (Os), gallium (Ga), titanium (Ti), vanadium (V), chromium (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), and rhodium (Rh)), a non-platinum alloy, and a combination thereof. More preferably, a combination of two or more metals selected from the platinum-based catalyst metal group is used. However, the present disclosure is not limited thereto. Any platinum-based catalyst metal that is available in the present technical field may be used without limitation.

Specifically, the platinum alloy may be selected from the group consisting of Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir, and a combination thereof, which may be used either alone or as a mixture of two or more thereof.

In addition, the non-platinum alloy may be selected from the group consisting of Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, and a combination thereof, which may be used either alone or as a mixture of two or more thereof.

The core particle may be used as a metal (black) alone, or may be used in the state in which a carrier is doped with a catalyst metal.

The carrier may be selected from among a carbon-based carrier, porous inorganic oxide, such as zirconia, alumina, titania, silica, or ceria, and zeolite. The carbon-based carrier may be selected from among graphite, super P, carbon fiber, carbon sheet, carbon black, Ketjen black, Denka black, acetylene black, carbon nanotube (CNT), carbon sphere, carbon ribbon, fullerene, activated carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, and a combination of one or more thereof. However, the present disclosure is not limited thereto. Any carrier that is available in the present technical field may be used without limitation.

The core particle may be located on the surface of the carrier, or may permeate into the carrier while filling pores in the carrier.

In the case in which a noble metal carrier dopant is used as the catalyst, a commercially available catalyst may be used, or the carrier may be doped with the noble metal in order to manufacture the catalyst. The process of doping the carrier with the noble metal is well-known in the art to which the present disclosure pertains and is easily understood by those skilled in the art even though a detailed description thereof is omitted in this specification.

The core particle may be included so as to account for 20 wt % to 80 wt % of the overall weight of each of the catalyst electrodes 30 and 30'. If the content of the core particle is less than 20 wt %, catalyst activation may be reduced. If the content of the core particle is greater than 80 wt %, the activation area may be reduced due to cohesion of core particle, whereby catalyst activation may be reduced.

In addition, each of the catalyst electrodes 30 and 30' may include a binder for improving the force of adhesion of the catalyst electrodes 30 and 30' and transferring protons. Preferably, an ionomer exhibiting ion conductivity is used as the binder. A description of the ionomer is the same as the above description of the interfacial adhesion layers 10 and 10', and therefore a duplicate description thereof will be omitted.

However, the ionomer may be used either alone or in the form of a mixture. In addition, the ion conductor may be optionally used together with a non-conductive compound in order to further increase the force of adhesion with the ion exchange membrane 50. Preferably, the amount of the ionomer that is used is adjusted according to the purpose thereof.

At least one selected from the group consisting of polytetrafluoroethylene (PTFE), a tetrafluoroethylene-hexafluoropropylene copolymer (FEP), a tetrafluoroethylene-perfluoroalkyl vinyl ether copolymer (PFA), ethylene/tetrafluoroethylene (ETFE), an ethylene chlorotrifluoroethylene copolymer (ECTFE), polyvinylidene fluoride, a polyvinylidene fluoride-hexafluoropropylene copolymer (PVdF-HFP), dodecylbenzenesulfonic acid, and sorbitol may be used as the non-conductive compound.

The binder may be included so as to account for 20 wt % to 80 wt % of the overall weight of each of the catalyst electrodes 30 and 30'. In the case in which the content of the binder is less than 20 wt %, generated ions may not be transferred successfully. In the case in which the content of the binder is greater than 80 wt %, pores are insufficient, whereby it may be difficult to supply hydrogen or oxygen (air), and an active area for reaction may be reduced.

In addition, the membrane-electrode assembly 100 may further include electrode substrates 40 and 40' located outside the catalyst electrodes 30 and 30'.

In order to smoothly supply hydrogen or oxygen, a porous conductive substrate may be used as each of the electrode substrates 40 and 40'. In a representative example, carbon paper, carbon cloth, carbon felt, or metal cloth (a porous film made of fibrous metal cloth or a metal film formed on the surface of cloth made of polymer fiber) may be used. However, the present disclosure is not limited thereto. In addition, preferably, a fluorine-based resin that has undergone water-repellency treatment is used as each of the electrode substrates 40 and 40', since it is possible to prevent reactant diffusion efficiency from being reduced by water generated during operation of the fuel cell. Polytetrafluoroethylene, polyvinylidene fluoride, polyhexafluoropropylene, polyperfluoroalkyl vinyl ether, polyperfluorosulfonylfluoride alkoxy vinyl ether, fluorinated ethylene propylene, polychlorotrifluoroethylene, or a copolymer thereof may be used as the fluorine-based resin.

In addition, a microporous layer for improving reactant diffusion efficiency at each of the electrode substrates 40 and 40' may be further included. The microporous layer may generally include conductive powder having a small particle diameter, such as carbon powder, carbon black, acetylene black, activated carbon, carbon fiber, fullerene, carbon nanotube, carbon nanowire, carbon nanohorn, or carbon nanoring.

The microporous layer is manufactured by coating a composition, including conductive powder, a binder resin, and a solvent, on each of the electrode substrates 40 and 40'. Polytetrafluoroethylene, polyvinylidene fluoride, polyhexafluoropropylene, polyperfluoroalkyl vinyl ether, polyperfluorosulfonylfluoride, alkoxy vinyl ether, polyvinyl alcohol, cellulose acetate, or a copolymer thereof is preferably used as the binder resin. Ethanol, alcohol, such as isopropyl alcohol, n-propyl alcohol, or butyl alcohol, water, dimethylacetamide, dimethyl sulfoxide, N-methylpyrrolidone, or tetrahydrofuran is preferably used as the solvent. The coating process may be performed using a screen printing method, a spray coating method, or a doctor-blade coating method depending on the viscosity of the composition. However, the present disclosure is not limited thereto.

At the time of manufacturing respective components of the membrane-electrode assembly 100 including the radical scavenger, the radical scavenger may be added to the respective components of the membrane-electrode assembly 100 depending on the position of the membrane-electrode assembly 100 at which the radical scavenger is included.

For example, in the case in which the radical scavenger is included in the ion exchange membrane 50, the radical scavenger may be added to a composition for forming an ion exchange membrane including the ionic conductor, and the composition for forming the ion exchange membrane including the radical scavenger may be coated and dried in order to manufacture a single membrane, or a porous support may be impregnated with the composition for forming the ion exchange membrane including the radical scavenger in order to manufacture an ion exchange membrane 50 having the form of a reinforcement membrane.

Similarly, in the case in which the radical scavenger is included in the catalyst electrodes 30 and 30', the radical scavenger may be added to a composition for forming catalyst electrodes, and the composition for forming the catalyst electrodes including the radical scavenger may be coated and dried in order to manufacture the catalyst electrodes 30 and 30' including the radical scavenger.

Also, in the case in which the radical scavenger is included between the ion exchange membrane 50 and the catalyst electrodes 30 and 30', a solution including the radical scavenger is coated and dried on the surfaces of the ion exchange membrane 50 or on the surfaces of the catalyst electrodes 30 and 30' in order to form coating layers.

In addition, the radical scavenger may be included in the interfacial adhesion layers 10 and 10'. Hereinafter, a method of manufacturing the membrane-electrode assembly 100 in the case in which the interfacial adhesion layers 10 and 10' include the radical scavenger will be described in detail by way of example.

The interfacial adhesion layers 10 and 10' including the radical scavenger may be formed by a step of mixing the radical scavenger and the ionomer with each other to manufacture a composition for forming interfacial adhesion layers and a step of coating and drying the composition for forming the interfacial adhesion layers on the surfaces of the ion exchange membrane 50 or on the surfaces of the catalyst electrodes 30 and 30'.

The composition for forming the interfacial adhesion layers may be manufactured by adding and mixing the radical scavenger and the ionomer to a solvent.

The composition for forming the interfacial adhesion layers may include the ionomer in a concentration of 0.1% to 30% or in a concentration of % to 10%. In the specification of the present disclosure, the concentration means percent concentration, and the percent concentration may be calculated as percentage of the mass of a solute to the mass of a solution. In the case in which the composition for forming the interfacial adhesion layers includes the ionomer within the above concentration range, it is possible to improve proton conductivity and interfacial bondability without increasing interfacial resistance of the membrane-electrode assembly. In the case in which the concentration of the ionomer is less than 0.1%, proton transfer ability may be reduced. In the case in which the concentration of the ionomer is greater than 30%, the ionomer may be nonuniformly distributed.

Any one selected from the group consisting of ethanol, alcohol, such as isopropyl alcohol, n-propyl alcohol, butyl alcohol, or glycerol, water, dimethylacetamide, dimethyl sulfoxide, dimethylformamide, N-methylpyrrolidone, tetrahydrofuran, and a mixture thereof may be used as the solvent.

The interfacial adhesion layers 10 and 10' may be formed by coating the composition for forming the interfacial adhesion layers on the ion exchange membrane 50 or on the catalyst electrodes 30 and 30' and drying the composition for forming the interfacial adhesion layers. The composition for forming the interfacial adhesion layers may be coated on the ion exchange membrane 50 using slot-die coating, bar coating, deep coating, comma coating, screen printing, spray coating, doctor blade coating, silk screen coating, gravure coating, painting, etc.

The drying process may be performed at 25° C. to 90° C. for 12 hours or more. In the case in which the drying temperature is less than 25° C. and the drying time is less than 12 hours, the interfacial adhesion layers 10 and 10' may be sufficiently dried. In the case in which drying is performed at a temperature higher than 90° C., the interfacial adhesion layers may be cracked.

Finally, the membrane-electrode assembly 100 is manufactured using the ion exchange membrane 50 including the interfacial adhesion layers 10 and 10' or the catalyst electrodes 30 and 30'.

In the case in which the interfacial adhesion layers 10 and 10' are formed on the catalyst electrodes 30 and 30', the ion exchange membrane 50 and the catalyst electrodes 30 and 30' may be thermally pressed in order to manufacture the membrane-electrode assembly 100. In the case in which the interfacial adhesion layers 10 and 10' are formed on the ion exchange membrane 50, the ion exchange membrane 50 and the catalyst electrodes 30 and 30' may be thermally pressed, or the catalyst electrodes 30 and 30' may be coated on the ion exchange membrane 50, in order to manufacture the membrane-electrode assembly 100.

Thermal pressing of the catalyst electrodes 30 and 30' and the ion exchange membrane 50 may be performed under conditions of 80° C. to 2000° C. and 5 kgf/cm$^2$ to 200 kgf/cm$^2$. In the case in which thermal pressing is performed under conditions of less than 80° C. and less than 5 kgf/cm$^2$, the catalyst electrodes 30 and 30' on a release film may not be appropriately transferred. In the case in which the temperature is greater than 200° C., the polymer of the ion exchange membrane 50 may be denatured. In the case in which the pressure is greater than 200 kgf/cm$^2$, a porous structure in each of the catalyst electrodes 30 and 30' may collapse, whereby performance of the catalyst electrodes may be reduced.

A fuel cell according to a further embodiment of the present disclosure includes the membrane-electrode assembly.

Figure 5:
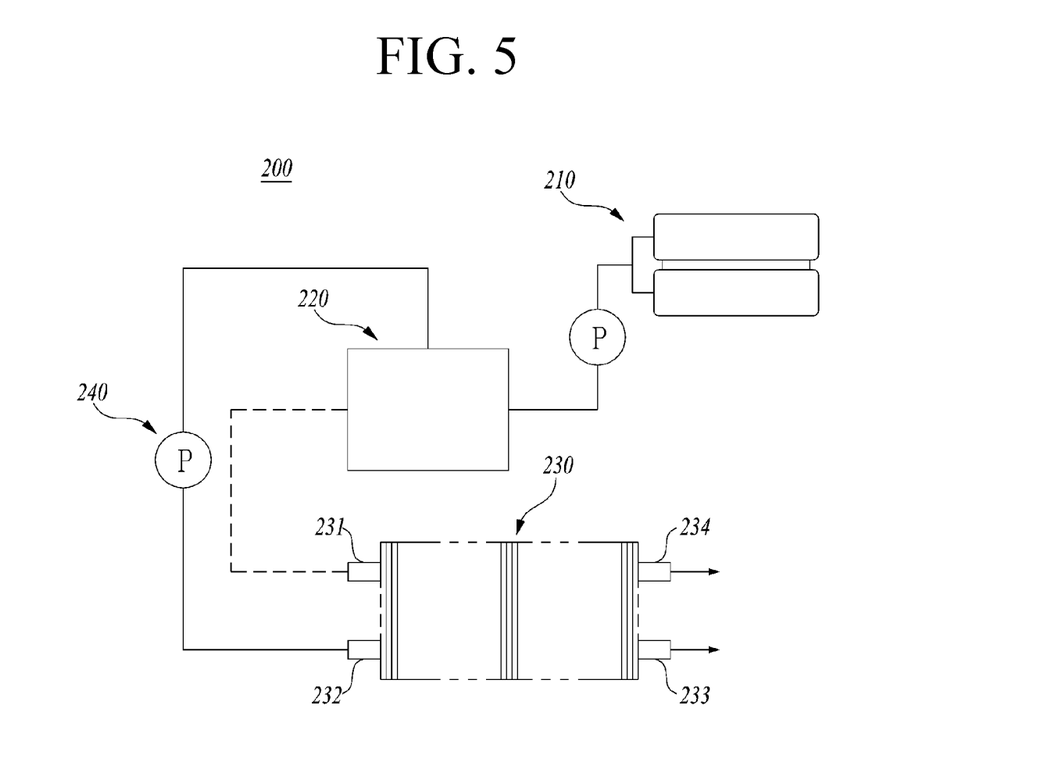
FIG. 5 is a schematic view showing the overall construction of a fuel cell according to an embodiment of the present disclosure.

FIG. 5 is a schematic view showing the overall construction of the fuel cell.

Referring to FIG. 5, the fuel cell 200 includes a fuel supply unit 210 for supplying a mixed fuel including fuel and water mixed with each other, a modification unit 220 for modifying the mixed fuel to generate a modified gas including hydrogen gas, a stack 230 for inducing electrochemical reaction between the modified gas including the hydrogen gas, supplied from the modification unit 220, and an oxidant to generate electrical energy, and an oxidant supply unit 240 for supplying the oxidant to the modification unit 220 and the stack 230.

The stack 230 includes a plurality of unit cells for inducing oxidation/reduction reaction between the modified gas including the hydrogen gas, supplied from the modification unit 220, and the oxidant, supplied from the oxidant supply unit 240, to generate electrical energy.

Each of the unit cells, which is an independent cell capable of generating electricity, includes the membrane-electrode assembly for inducing an oxidation/reduction reaction between a modified gas including hydrogen gas and oxygen in an oxidant, and a separator (which is also called a bipolar plate; hereinafter referred to as a "separator") for supplying the modified gas including the hydrogen gas and the oxidant to the membrane-electrode assembly. The separators are disposed at opposite sides of each of the membrane-electrode assemblies in the state in which the membrane-electrode assembly is located between the separators. The separators located at the outermost sides of the stack may be particularly referred to as end plates.

One of the end plates is provided with a first supply pipe 231 for injecting a modified gas including hydrogen gas, supplied from the modification unit 220, and a second supply pipe 232 for injecting oxygen gas, and the other end plate is provided with a first discharge pipe 233 for discharging the modified gas including the remaining unreacted hydrogen gas in the unit cells to the outside and a second discharge pipe 234 for discharging the remaining unreacted oxidant in the unit cells to the outside.

MODE FOR INVENTION

Hereinafter, concrete examples of the present disclosure will be set forth. However, the following examples are given merely to concretely illustrate or describe the present disclosure, and the present disclosure is not limited thereto. In addition, content that is not described herein may be sufficiently technically inferred by those skilled in the art to which the present disclosure pertains, and therefore a description thereof will be omitted.

Manufacturing Example 1: Manufacture of Radical Scavenger

Example 1-1

Dopamine was added to a tris-hydrochloride buffer solution in order to manufacture a composition for coating a carbon precursor, and a core particle capable of decomposing a peroxide, such as $CeO_2$, or a radical was added to the composition for coating the carbon precursor. At this time, the composition for coating the carbon precursor included 0.3 parts by weight of the carbon precursor based on 100 parts by weight of the core particle.

The composition for coating the carbon precursor having the core particle added thereto was stirred at 25° C. for 12 hours at 250 rpm, the carbon precursor was stabilized at 250° C. in a nitrogen atmosphere, and the carbon precursor was carbonized at 700° C. in a nitrogen atmosphere in order to manufacture a radical scavenger having a porous carbon coating layer formed on the surface of the core particle.

In the manufactured radical scavenger, the thickness of the porous carbon coating layer was 2 nm to 5 nm.

Example 1-2

A composition for coating a carbon precursor identical to the composition for coating the carbon precursor according to Example 1-1 was manufactured, was stirred at 25° C. for 3 hours at 250 rpm, and was carbonized in the same manner as in Example 1-1 in order to manufacture a radical scavenger having a porous carbon coating layer formed thereon.

In the manufactured radical scavenger, the thickness of the porous carbon coating layer was 1 to 2 nm.

Example 1-3

A composition for coating a carbon precursor identical to the composition for coating the carbon precursor according to Example 1-1 was manufactured, was stirred at 25° C. for 24 hours at 250 rpm, and was carbonized in the same manner as in Example 1-1 in order to manufacture a radical scavenger having a porous carbon coating layer formed thereon.

In the manufactured radical scavenger, the thickness of the porous carbon coating layer was 5 nm or more, and a carbon cluster was formed.

Manufacturing Example 2: Manufacture of Membrane-Electrode Assembly

Examples 2-1 to 2-4: Membrane-Electrode Assemblies Each Including Interfacial Adhesion Layers Including Radical Scavenger In order to manufacture a composition for forming interfacial adhesion layers, the radical scavenger manufactured according to Example 1-1 and an Nafion ionomer were mixed with each other in composition ratios shown in Table 1 below, and the mixture was dispersed in IPA. At this time, the solid content in the solvent was adjusted to 10 wt %.

In order to prepare an ion exchange membrane, sulfonated PAES was dissolved in DMAC so as to account for 10 wt %. A prepared composition for forming an ion exchange membrane was coated on a glass plate using a blade coating method, and was dried in an oven of 60° C. for 24 hours in order to manufacture an ion exchange membrane.

The manufactured ion exchange membrane was immersed in the composition for forming interfacial adhesion layers for dip coating such that the composition for forming interfacial adhesion layers was coated on each surface of the ion exchange membrane, and was dried in an oven of 60° C. for 24 hours. Subsequently, interfacial adhesion layers were annealed in an oven of 120° C. for 2 hours.

TABLE 1

|  | Example 2-1 | Example 2-2 | Example 2-3 | Example 2-4 |
|---|---|---|---|---|
| Content of $CeO_2$ based on solid content (wt %) | 4 | 8 | 12 | 16 |

Comparative Example 2-1: Membrane-Electrode Assembly Including Interfacial Adhesion Layers Including No Radical Scavenger In order to manufacture a composition for forming interfacial adhesion layers, a Nafion ionomer was dispersed in IPA so as to account for 10 wt %.

In order to prepare an ion exchange membrane, sulfonated PAES was dissolved in DMAC so as to account for 10 wt %. A prepared composition for forming an ion exchange membrane was coated on a glass plate using a blade coating method, and was dried in an oven of 60° C. for 24 hours in order to manufacture an ion exchange membrane.

The manufactured ion exchange membrane was immersed in the composition for forming interfacial adhesion layers for dip coating such that the composition for forming interfacial adhesion layers was coated on each surface of the ion exchange membrane, and was dried in an oven of 60° C. for 24 hours. Subsequently, interfacial adhesion layers were annealed in an oven of 120° C. for 2 hours.

Comparative Example 2-2: Membrane-Electrode Assembly Having Radical Scavenger Dispersed in Ion Exchange Membrane In order to manufacture a composition for forming interfacial adhesion layers, a Nafion ionomer was dispersed in IPA so as to account for 10 wt %.

In order to prepare an ion exchange membrane having a radical scavenger dispersed therein, sulfonated PAES and $CeO_2$ were dissolved in DMAC. At this time, the solid content in a composition for forming an ion exchange membrane was 10 wt %, and the content of $CeO_2$ in the solid content was 2 wt %.

The prepared composition for forming an ion exchange membrane was coated on a glass plate using a blade coating method, and was dried in an oven of 60° C. for 24 hours in order to manufacture an ion exchange membrane.

The manufactured ion exchange membrane was immersed in the composition for forming interfacial adhesion layers for dip coating such that the composition for forming interfacial adhesion layers was coated on each surface of the ion exchange membrane, and was dried in an oven of 60° C. for 24 hours. Subsequently, interfacial adhesion layers were annealed in an oven of 120° C. for 2 hours.

Figure 6:
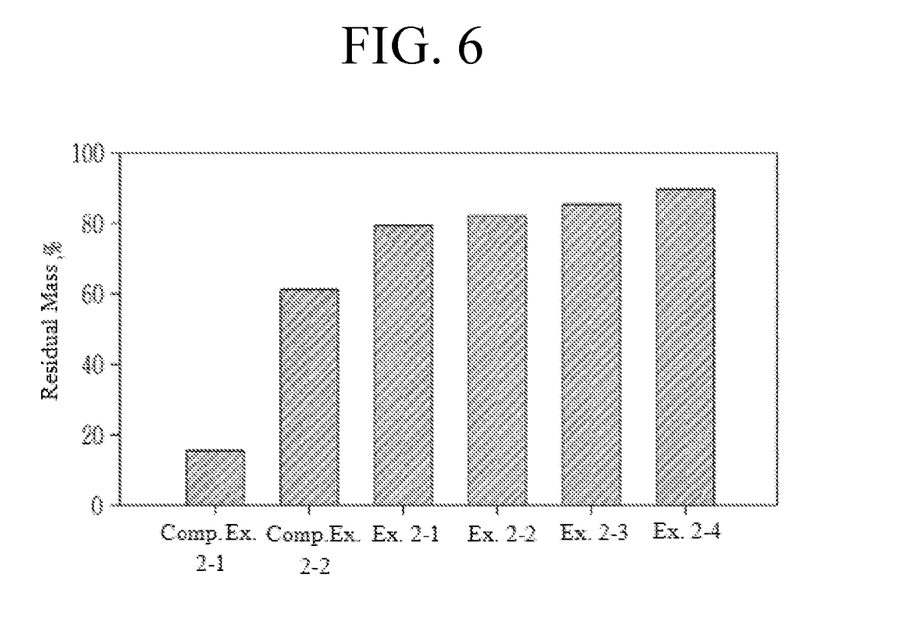
FIG. 6 is a graph showing chemical durability of each of ion exchange membranes manufactured according to Examples and Comparative Examples.

Experimental Example: Evaluation of Manufactured Membrane-Electrode Assemblies In order to confirm the effect of improvement of chemical durability of each of the ion exchange membranes manufactured according to Examples and Comparative Examples, each of the manufactured ion exchange membranes was immersed in a Fenton solution, was left at 60° C., was taken out of the solution after 16 hours in order to measure the residual mass of the ion exchange membrane, whereby chemical durability of the ion exchange membrane was confirmed. Results are shown in FIG. 6. At this time, the Fenton solution was an aqueous solution composed of 3 wt % of $H_2O_2$ and 4 ppm of $FeSO_4$.

FIG. 6 is a graph showing chemical durability of each of the ion exchange membranes manufactured according to Examples and Comparative Examples in terms of residual mass. As chemical durability of the ion exchange membrane increases, the amount of a polymer of the ion exchange membrane dissolved in the Fenton solution is further reduced, the residual mass of the ion exchange membrane is maintained higher. Referring to FIG. 6, the ion exchange membrane manufactured according to Comparative Example 2-1, which included no radical scavenger, exhibited the lowest residual mass, and the ion exchange membrane manufactured according to Comparative Example 2-2, which had 2 wt % of the radical scavenger dispersed therein, exhibited the second lowest residual mass. In contrast, ion exchange membranes manufactured according to Examples 2-1 to 2-4, each of which had the radical scavenger included in the interfacial adhesion layers, exhibited residual masses higher than the residual mass of the ion exchange membrane manufactured according to Comparative Example 2-1. In addition, the higher the content of the radical scavenger in the interfacial adhesion layers, the higher the residual mass of the ion exchange membrane. Consequently, it can be seen that the interfacial adhesion layers including the radical scavenger are capable of further improving chemical durability of the ion exchange membrane.

Also, in order to confirm the effect of retention of ion conductivity of each of the membrane-electrode assemblies manufactured according to Examples and Comparative Examples, each of the manufactured membrane-electrode assemblies was fastened to an apparatus for evaluating each unit cell of a fuel cell, and proton conductivity based on relative humidity was measured at 80° C. using impedance. Results are shown in FIG. 7.

Figure 7:
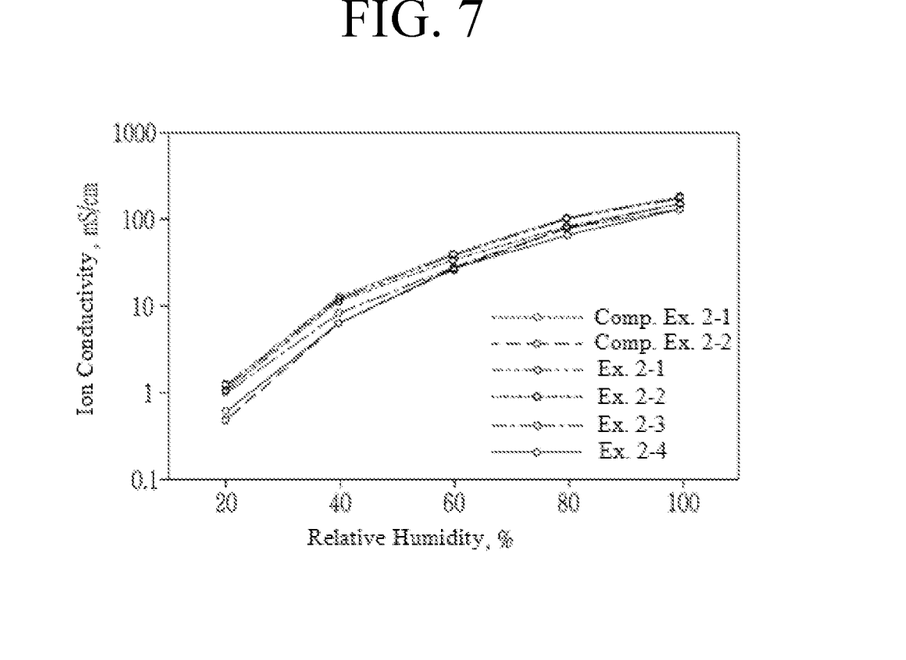
FIG. 7 is a graph showing proton conductivity of each of membrane-electrode assemblies manufactured according to Examples and Comparative Examples.

FIG. 7 is a graph showing proton conductivity based on relative humidity of each of the membrane-electrode assemblies manufactured according to Examples and Comparative Examples. The membrane-electrode assembly manufactured according to Comparative Example 2-1, which included no radical scavenger, exhibited the highest proton conductivity, and the membrane-electrode assembly manufactured according to Comparative Example 2-2, which had 2 wt % of the radical scavenger dispersed in the ionic conductor, exhibited the lowest proton conductivity. Meanwhile, it can be confirmed that the membrane-electrode assembly manufactured according to Example 2-1, which had 4 wt % of the radical scavenger concentrated in the interfacial adhesion layers, exhibited proton conductivity similar to the proton conductivity of the membrane-electrode assembly manufactured according to Comparative Example 2-1, although the radical scavenger was included. Also, it can be observed that, as the content of the radical scavenger in the interfacial adhesion layers was increased, proton conductivity of the membrane-electrode assembly was gradually reduced. In the case of Examples 2-1 to 2-3, excluding Example 2-4, each membrane-electrode assembly exhibited proton conductivity higher than the proton conductivity of the membrane-electrode assembly manufactured according to Comparative Example 2. Consequently, it can be confirmed that loss in ion conductivity of the interfacial adhesion layers including the radical scavenger according to the present disclosure is minimized.

It can be observed from the results of FIGS. 6 and 7 that Examples 2-1 to 2-3, to which the interfacial adhesion layers were applied, exhibited higher chemical durability and proton conductivity than Comparative Example 2-2, in which the radical scavenger was dispersed in the entire ion exchange membrane, and therefore it can be confirmed that chemical durability of the interfacial adhesion layers including the radical scavenger according to the present disclosure is greatly improved while loss in ion conductivity of the interfacial adhesion layers is minimized.

Although the preferred embodiments of the present disclosure have been described above, the scope of the present disclosure is not limited thereto, and various modifications and improvements made by those skilled in the art using the basic concept of the present disclosure defined in the accompanying claims fall within the scope of the present disclosure.

DESCRIPTION OF REFERENCE NUMERALS

1: Core particle capable of decomposing peroxide or radical
2: Porous carbon coating layer
100: Membrane-electrode assembly
10, 10': Interfacial adhesion layers
20, 20': Electrodes
30, 30': Catalyst electrodes
40, 40': Electrode substrates
50: Ion exchange membrane
200: Fuel cell
210: Fuel supply unit 220: Modification unit
230: Stack 231: First supply pipe
232: Second supply pipe 233: First discharge pipe
234: Second discharge pipe 240: Oxidant supply unit

INDUSTRIAL APPLICABILITY

The present disclosure relates to a radical scavenger, a method of manufacturing the same, a membrane-electrode assembly including the same, and a fuel cell including the same. The membrane-electrode assembly is capable of minimizing loss in ion conductivity of an ion exchange membrane while improving chemical durability of the ion exchange membrane, preventing chemical degradation of the ion exchange membrane occurring during long-term operation of a fuel cell, securing excellent long-term performance of the ion exchange membrane, and being commonly used irrespective of the kind of the ion exchange membrane, such as a fluorine-based ion exchange membrane or a hydrocarbon-based ion exchange membrane.

The invention claimed is:

1. A membrane-electrode assembly comprising:
a first electrode;
a second electrode;
an ion exchange membrane between the first and second electrodes; and
a radical scavenger in the first electrode, in the second electrode, in the ion exchange membrane, between the first electrode and the ion exchange membrane, and/or between the second electrode and the ion exchange membrane,
wherein the radical scavenger comprises:
a core particle capable of decomposing a peroxide or a radical, the core particle including cerium (Ce), cerium salt, cerium oxide, or a mixture of at least two thereof; and
a porous carbon coating layer located on a surface of the core particle, the porous carbon coating layer being a layer formed through a carbonization process to convert a carbon precursor into carbon,
wherein the porous carbon coating layer has a pore size of 3 to 5 Å and a thickness of 0.5 to 10 nm,
wherein the first electrode includes a first catalytic core particle for hydrogen oxidation reaction,
wherein the second electrode includes a second catalytic core particle for oxygen reduction reaction, and
wherein each of the first and second catalytic core particles is formed of any one selected from the group consisting of Pt, Pd, Ru, Ir, Os, a Pt alloy, a non-Pt alloy, and a combination of at least two thereof,
wherein the Pt alloy is any one selected from the group consisting of Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr—Ir, and a combination of at least two thereof, and
wherein the non-Pt alloy is any one selected from the group consisting of Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, and a combination of at least two thereof.

2. The membrane-electrode assembly according to claim 1, further comprising:
an interfacial adhesion layer located between the ion exchange membrane and the first or second electrode, wherein
the interfacial adhesion layer comprises an ionomer and the radical scavenger.

3. The membrane-electrode assembly according to claim 2, wherein the interfacial adhesion layer comprises 0.1 wt % to 70 wt % of the radical scavenger based on a total weight of the interfacial adhesion layer.

4. The membrane-electrode assembly according to claim 2, wherein the interfacial adhesion layer has a thickness of 10 nm to 10 μm.

5. The membrane-electrode assembly according to claim 2, wherein a weight per unit area of the interfacial adhesion layer is 0.01 mg/cm² to 2.0 mg/cm².

6. A fuel cell comprising the membrane-electrode assembly according to claim 1.

* * * * *